United States Patent [19]

Najjar et al.

[11] Patent Number: 4,774,021
[45] Date of Patent: * Sep. 27, 1988

[54] PARTIAL OXIDATION OF SULFUR-CONTAINING SOLID CARBONACEOUS FUEL

[75] Inventors: Mitri S. Najjar, Hopewell Junction; Roger J. Corbeels, Wappingers Falls, both of N.Y.

[73] Assignee: Texaco Inc., White Plains, N.Y.

[*] Notice: The portion of the term of this patent subsequent to Mar. 32, 2004 has been disclaimed.

[21] Appl. No.: 32,157

[22] Filed: Mar. 27, 1987

[51] Int. Cl.$^4$ ............................................. L01O 3/02
[52] U.S. Cl. ................................. 252/373; 48/197 R
[58] Field of Search ...................... 252/373; 48/197 R

[56] References Cited

U.S. PATENT DOCUMENTS 4,654,164  3/1987  Najjar .................................. 252/373

Primary Examiner—Howard T. Mars
Attorney, Agent, or Firm—Robert A. Kulason; James J. O'Loughlin; Albert Brent

[57] ABSTRACT

A process for the simultaneous partial oxidation and desulfurization of sulfur and silicate-containing solid carbonaceous fuel for the production of gaseous mixtures comprising $H_2$ and CO and containing less than about 0.05 volume % of $H_2S$ and COS. In the process, an aqueous slurry of the solid carbonaceous fuel and a copper-containing compound are reacted by partial oxidation in the reaction zone of a free-flow unobstructed down-flowing vertical refractory lined gas generator with a controlled amount of free-oxygen containing gas and with optionally a temperature moderator so that an equilibrium oxygen concentration is provided in the gas phase in the reaction zone having a partial pressure which is less than about $10^{-6}$ atmosphere. The O/C atomic ratio is in the range of about 0.5 to 2.0. The $H_2O$/solid carbonaceous fuel weight ratio is in the range of about 0.2 to 0.7. Further, the total moles of copper in the reaction zone is at least equal to about 1.0 times the moles of sulfur in the solid carbonaceous fuel. The partial oxidation and desulfurization reactions take place simultaneously at a temperature which produces fly-ash or molten slag at an increased thermal efficiency. At least about 90 wt. % of the sulfur in the solid carbonaceous fuel in the reaction zone is converted into copper oxysulfide particulate matter which leaves the reaction zone along with the fly-ash or molten slag entrained in the hot raw effluent gas stream comprising $H_2$, CO, $CO_2$ at least one gas selected from the group consisting of $H_2O$, $N_2$, $CH_4$ and A; and less than about 0.05 volumne % of $H_2S$ and COS. The mole ratio in the reaction zone for $H_2O/H_2$ is in the range of about 0.4 to 3.0.

14 Claims, No Drawings

PARTIAL OXIDATION OF SULFUR-CONTAINING SOLID CARBONACEOUS FUEL

FIELD OF THE INVENTION

This invention pertains to the simultaneous partial oxidation and desulfurization of a sulfur and silicate-containing solid carbonaceous fuel. More particularly, it pertains to a process for the partial oxidation of a sulfur and silicate-containing carbonaceous fuel for the production of gaseous mixtures comprising $H_2$ and CO and containing less than about 0.05 volume % of $H_2S$ and COS.

It would be highly desirable to use comparatively low-cost readily available sulfur and silicate-containing solid carbonaceous fuels such as coal, lignite, petroleum coke and mixtures thereof for the production of gaseous mixtures comprising $H_2+CO$. These gaseous mixtures are commonly known as synthesis gas, reducing gas, and fuel gas depending on the actual gaseous composition. For example synthesis gas comprises a specific $H_2/CO$ mole ratio, reducing gas has a high reducing ratio e.g. $H_2+CO/H_2O+CO_2$, and fuel gas contains supplemental $CH_4$ and has a relatively high heat content.

By conventional partial oxidation gasification processes, sulfur containing gases e.g. $H_2S$ and COS in the amount of about 0.5 to 2.0 mole % are produced along with the $H_2+CO$. These sulfur-containing gaseous impurities are undesirable. They corrode piping and equipment upon contact; and, they deactivate catalysts. Accordingly, raw gas streams from the reaction zone may require additional downstream gas purification in order to remove the sulfur-containing gases.

The need for means to remove a major portion of the sulfur in synthesis gas as generated by the partial oxidation process is widely recognized. In particular, removal of sulfur from synthesis gas at high temperature is of great interest. The combined-cycle thermal efficiency is improved by eliminating the need to cool the product gases prior to low-temperature acid-gas wet scrubbing. Gaseous impurities, including $H_2S$, COS and $CO_2$ are removed from raw synthesis gas by low temperature condensation and by solvent absorption in a separate gas purification operation located downstream from the gas generator in coassigned U.S. Pat. No. 4,052,176. Further, in this process, it is necessary to cool the hot raw gas stream from a temperature of 2700° F. to −70° F. before the sulfur-containing gas are separated.

Reference may be made to U.S. Pat. No. 4,599,955 which describes the use of an horizontal cyclone type furnace operating at a temperature of at least 2192° F. with a sulfur fixing agent to provide molten slag with the necessary fluidity. Unfortunately molten slag will attack the refractory lining of the furnace and shorten its life. Further, any iron present in the coal is reduced to elemental form. In contrast, advantageously the subject invention described herein employs a vertical free-flow unobstructed refractory lined generator operating in the fly-ash mode at a lower temperature e.g. below 2000° F. No supplemental copper is added to react with the silicates and no molten slag is produced. The cost of supplemental copper to react with the silicates is avoided. Further, the life of the refractory lining in the gas generator is increased. Also, iron is tied up in the fly-ash as an iron silicate; and substantially no elemental iron or copper is produced. In coassigned U.S. Pat. No. 4,654,164, a copper-containing additive was introduced into the reaction zone of the gas generator to produce a liquid phase washing agent that collected and transported at least a portion of the vanadium-containing oxide laths and spinels and other ash components including copper sulfide and refractory out of the reaction zone.

SUMMARY OF THE INVENTION

This invention relates to a process for the production of gaseous mixtures comprising $H_2+CO$ and containing less than 0.05 volume % of $H_2S+COS$ by the simultaneous partial oxidation and desulfurization of a sulfur and silicate-containing comminuted solid carbonaceous fuel. In addition to carbon, the solid carbonaceous fuel comprises (basis solid fuel) about 0.2 to 6.0 wt. % sulfur and about 0.1 to 30 wt. % silicate compounds including iron silicate. A separate gas purification step downstream from the gas generator to remove sulfur containing gases is optional in the subject invention.

In the process, an aqueous slurry comprising a sulfur and silicate-containing solid carbonaceous fuel and a copper-containing compound are reacted by partial oxidation in the reaction zone of a free-flow unobstructed down-flowing vertical refractory lined gas generator with a controlled amount of free-oxygen containing gas and optionally a temperature moderator so that an equilibrium oxygen concentration is produced in the gas phase in the reaction zone having a partial pressure which is less than about $10^{-6}$ atmosphere. The O/C atomic ratio is in the range of about 0.5 to 2.0. The $H_2O$/solid carbonaceous fuel weight ratio is in the range of about 0.2 to 0.7. Further, the total moles of copper in the reaction zone is at least equal to about 1.0, such as about 2.1, times the moles of sulfur in the solid carbonaceous fuel. The partial oxidation and desulfurization reactions take place simultaneously in the fly-ash mode or in the slagging mode. In the fly-ash mode the temperature in the reaction zone is about 10° to 200° F. below the softening temperature of the ash in the solid carbonaceous fuel and below about 2000° F. In the slagging mode the temperature in the reaction zone is in the range of above about 2000° F. to 2900° F. and above the softening temperature of the ash in the said carbonaceous fuel. The pressure in the reaction zone for both modes is in the range of about 2 to 250 atmospheres. Substantially no elemental iron or copper is produced; there is substantially no formation of additional copper silicates; and about 70 to 98 wt. % of the carbon in the original solid carbonaceous fuel is converted into carbon oxides e.g $CO+CO_2$. At least about 90 wt.% of the sulfur in the solid carbonaceous fuel in the reaction zone is converted into copper oxysulfide particulate matter which leaves the reaction zone along with the fly-ash or molten slag entrained in the hot raw effluent gas stream comprising $H_2$, CO, $CO_2$, at least one gas selected from the group consisting of $H_2O$, $N_2$, $NH_3$, $CH_4$ and A; and less than 0.05 volume % of $H_2S$ and COS. The mole ratio in the reaction zone for $H_2O/H_2$ is in the range of about 0.4 to 3.0. The hot raw effluent gas stream is cooled and cleaned without contact with water.

DISCLOSURE OF THE INVENTION

This invention relates to the partial oxidation of sulfur and silicate-containing solid carbonaceous fuels such as coal and petroleum coke, or mixtures thereof to produce synthesis gas, reducing gas, or fuel gas which is substantially free-from sulfur. More particularly, it pertains to a partial oxidation process employing an additive system for in-situ capturing the sulfur from the fuel at high temperature, and to a special gasifier operating mode to maximize the effectiveness of the additive. In the case of petroleum coke feedstocks, the additive system will also help with the removal of vanadium and nickel contaminants from the gasifier.

Basic thermodynamics and cost, the addition of copper-containing compounds to the partial oxidation gasifier has been found to be highly effective to capture the sulfur contained in sulfur and silicate-containing solid carbonaceous fuels. Thermodynamics favor copper, especially at high gasification temperatures, e.g. about 2000° C. and below. However, the syngas produced must have a sufficiently high oxygen potential for copper to capture the sulfur. To produce a syngas with sufficiently high oxygen potential, the following methods of feeding are recommeded: (1) dilute aqueous slurry feeding with or without skimming of the carrier liquid; and (2) solid carbonaceous fuel and copper-containing material in admixture with steam or $CO_2$.

The sulfur and silicate-containing solid carbonaceous fuel feed materials in the subject process include by definition coal e.g. anthracite, bituminous, subbituminous, lignite, coke made from coal; petroleum coke; oil shale; tar sands; pitch; and mixtures thereof. In addition to carbon, solid carbonaceous fuel comprises (basis solid fuel) about 0.2 to 6.0 wt. % of sulfur and about 0.1 to 30 wt. % of silicate compounds including iron silicate. The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 0.425 mm (Alternative No. 40). The moisture content of the solid carbonaceous fuel particles is in the range of about 0 to 40 wt. %, such as 5 to 20 wt. %. The feedstock may be dried when necessary.

The ground solid carbonaceous fuel is mixed with a copper-containing material selected from the group consisting of copper oxide, copper hydroxide, copper carbonate, copper nitrate, copper chloride, and mixtures thereof. Also, the copper-containing material comprises a cuprous or cupric organic compound selected from the group consisting of naphthenates, oxalates, acetates, benzoates, oleates, tartrates, and mixtures thereof. Alternatively, the copper-containing material may be mixed with the solid carbonaceous fuel before, during or after the solid carbonaceous fuel is ground. Copper oxide is the preferred copper-containing material. Sufficient copper containing compound is introduced so that the total amount of copper in the reaction zone comprising the moles of copper in solid fuel and the moles of copper in the copper containing compound added is at least equal to about 1.0, such as about 2.1, times the moles of sulfur in the solid carbonaceous fuel.

The solid carbonaceous fuel in admixture with copper-containing compound is introduced into the reaction zone of a vertical refractory-lined, unobstructed, free-flow down-flowing noncatalytic partial oxidation gas generator by way of a burner. Simultaneously, a stream of free-oxygen containing gas and optionally a temperature moderator are introduced into the gas generator. Single and double annulus type burners for introducing the feedstreams into the partial oxidation gas generator are shown in coassigned U.S. Pat. Nos. 3,528,930 and 3,847,564, which are incorporated herein by reference. In one embodiment, the aqueous slurry of solid carbonaceous fuel and copper-containing compound is introduced downwardly into said reaction zone by way of the intermediate annular passage of a burner comprising a central passage, said concentric annular passage, and an outer concentric annular passage; and a stream of free-oxygen containing gas is simultaneously passed through the central and outer annular passages of said burner. Partial oxidation gas generating process gaseous and liquid $CO_2$-solid carbonaceous fuel feeds are employed as shown in coassigned U.S. Pat. Nos. 3,976,442, and 3,976,443 respectively, and are incorporated herein by reference.

Pumpable slurries of a mixture of the solid carbonaceous fuel and copper-containing material in a liquid $CO_2$ carrier may be introduced into the gas generator. For example, the liquid slurry may comprise 30–70 wt. % of solid carbonaceous fuel and copper-containing material and the remainder is liquid $CO_2$. $CO_2$ is skimmed from the $CO_2$-solid fuel mixture prior to the mixture being introduced into the burner at a temperature in the range of about −67° F. to 100° F. depending on the pressure. After skimming, the mixture of solid carbonaceous fuel and $CO_2$ contains about 35 to 75 wt. % of solids. In still another embodiment, the feedstream comprises a slurry of liquid hydrocarbonaceous material and solid carbonaceous fuel. Water in liquid phase may be mixed with the liquid hydrocarbonaceous carrier, for example as an emulsion. A portion of the $H_2O$ i.e., about 0 to 25 weight % of the total amount of $H_2O$ present may be introduced as steam in admixture with free-oxygen containing In the preferred embodiment, the fuel feed to the gas generator comprises pumpable aqueous slurries comprising 30 to 70 wt. % solid particulates. In such case, steam skimming may be optionally used to reduce the amount of $H_2O$ entering the gas generator by about 5 to 10 wt. % (basis weight of feed) prior to introducing the solid fuel into the reaction zone.

The term liquid hydrocarbonaceous material as used herein to describe suitable liquid carriers is intended to include various materials, such as liquified petroleum gas, petroleum distillates and residues, gasoline, naphtha, kerosene, crude petroleum, asphalt, gas oil, residual oil, tar sand oil, shale oil, coal derived oil, aromatic hydrocarbon (such as benzene, toluene, xylene fractions), coal tar, cycle gas oil from fluid-catalytic-cracking operation, furfural extract of coker gas oil, methanol, ethanol and other alcohols, by-product oxygen containing liquid hydrocarbons from oxo or oxyl synthesis, and mixtures thereof.

The partial oxidation reaction takes place in the reaction zone of the gas generator at a temperature which is about 10° to 200° F. below the softening temperature of the ash in the solid carbonaceous fuel and below about 2000° C. The pressure in the reaction zone is in the range of about 2 to 250 atmosphere, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 2.0. The free-oxygen is intended to include air, oxygen-enriched air, i.e., greater than 21 mole % oxygen, and substantially pure oxygen, i.e. greater than 95 mole % oxygen, (the remainder comprising $N_2$ and rare gases). The free-oxygen containing gas and temperature moderator is provided in a controlled amount so that an equilibrium oxygen concentration is provided in the gas phase in the reaction zone having a partial pressure which is less than about $10^{-6}$ atmosphere. The mole ratio $H_2O/H_2$ in the reaction zone is in the range of about 0.4 to 3.0, such as about 0.6 to 1.0. The weight ratio $H_2O$/solid carbonaceous fuel in the reaction zone is in the range of about 0.2 to 0.7.

The raw product gas leaving the reaction zone may have the following composition in mole percent: $H_2$ 8 to 60, CO 8 to 70, $CO_2$ 1 to 20, $H_2O$ 1 to 40, $CH_4$ nil to 30, $H_2S$+COS nil to 0.05, $N_2$ nil to 85 and A nil to 2.0.

Substantially no elemental iron or copper is produced in the reaction zone; there is substantially no formation of additional copper silicates; and about 90 to 98 wt. % of the carbon in the original solid carbonaceous fuel is converted into carbon oxides e.g. CO+$CO_2$. About 40 to 90 volume % of the carbon oxides comprises CO. At least about 90 wt. % of the sulfur in the solid carbonaceous fuel in the reaction zone is converted into copper oxysulfide particulate matter which leaves the reaction zone along with the fly-ash or molten slag entrained in the hot raw effluent gas stream. The copper oxysulfide may be easily separated from the fly-ash or slag. By definition, fly-ash is the unmelted remnant of combusted particles of the solid carbonaceous fuel. On a dry basis, the fly-ash may comprise in wt. % $SiO_2$ 10 to 50, $Al_2O_3$ 10 to 50, iron oxides and sulfides 0 to 40, and others. The fly-ash particles in the hot raw gas stream have a particle size in the range of about 0.01 to 1000 microns. The fly-ash has not reached the melting temperature of the mineral matter which is originally part of the solid carbonaceous fuel. Molten slag is substantially molten ash and represents the fused mineral matter of the solid carbonaceous fuel.

Advantageously, in the subject process there is substantially no reaction between the supplemental copper-containing materials and the silicates in the solid carbonaceous fuel feed. Accordingly no supplemental copper-containing material is introduced into the reaction zone to provide for this slagging reaction. Since the supplemental copper-containing material reacts only with the sulfur in the solid carbonaceous fuel feed to produce copper oxysulfide, a smaller amount of copper-containing material is required in the instant process at a great cost savings.

The mixture of fly-ash and copper oxysulfide entrained in the hot raw effluenet stream of synthesis gas from the reaction zone is separated from the synthesis gas. In one embodiment, the hot raw effluent gas stream from the partial oxidation reaction may be cooled and cleaned by contact with a liquid hydrocarbonaceous fuel cooling and scrubbing agent in a conventional gas quench tank and/or in gas scrubbing equipment. For example reference is made to coassigned U.S. Pat. No. 4,007,018, which is incorporated herein by reference. A slurry of fly-ash and copper oxysulfide in liquid hydrocarbonaceous fuel is produced. After being steam stripped and separating $H_2S$, the sulfur-depleted slurry may be recycled to the front end of the process. There it is mixed with fresh sulfur and silicate containing solid carbonaceous fuel and make-up copper-containing material in the preparation of fresh feed mixture to the partial oxidation gas generator. The mixture of steam and $H_2S$ is then sent to a sulfur-recovery facility. Water is avoided as the cooling and scrubbing agent for the hot raw effluent gas stream from the gas generation in order to prevent the copper oxysulfide entrained in the hot raw effluent gas stream from reacting with the water to produce unwanted $H_2S$ in the product gas.

In another embodiment, the hot raw effluent gas stream from the reaction zone is mixed with a $CO_2$-rich stream to provide the effluent gas stream with a $CO_2/H_2$ mole ratio in the range of about 10 to 0.5 and passing the $CO_2$-enriched effluent gas stream through a copper-rich bed; wherein substantially all of the remaining gaseous sulfur compounds in the effluent gas stream are removed by reacting with copper in said bed and converted into copper oxysulfide.

In another embodiment, the aforesaid copper-rich bed contains an additional additive selected from the group consisting of magnesium, zinc, manganese, and mixtures thereof. The mole ratio of copper in said copper-rich bed to said additional additive is in the range of about 10 to 100.

Alternatively, the hot raw effluent gas stream may be cooled by indirect heat exchange with a coolant before the gas scrubbing step. For example, the hot raw effluent gas stream may be passed through a waste heat boiler to produce steam and then scrubbed with a liquid hydrocarbonaceous fuel.

Various modifications of the invention as herein before set forth may be made without departing from the spirit and scope thereof, and therefore, only such limitations should be made as are indicated in the appended claims.

We claim:

1. In a process for the simultaneous partial oxidation and desulfurization of a sulfur and silicate-containing comminuted solid carbonaceous fuel comprising (basis solid fuel) 0.2 to 0.6 wt. % sulfur and 0.1 to 30 wt. % of silicate compounds including iron silicate the improvement comprising:

(1) reacting in the reaction zone of a partial oxidation gas generator a feed mixture comprising said solid carbonaceous fuel and copper-containing material with a controlled amount of free-oxygen containing gas, $H_2O$, and optionally a temperature moderator so that an equilibrium oxygen concentration is provided in the gas phase in the reaction zone with a partial pressure which is greater than about $10^{-6}$ atmosphere, the O/C atomic ratio is in the range of about 0.5 to 2.0, the $H_2O$/solid carbonaceous fuel weight ratio is in the range of about 0.2 to 0.7, the total moles of copper in the reaction zone is at least equal to about 1.0 times the moles of sulfur in the solid carbonaceous fuel, about 70 to 98 wt.% of the carbon in said solid carbonaceous fuel is converted into carbon oxides thereby producing a raw product gas mixture comprising $H_2$, CO, $CO_2$, less than about 0.05 mole % of $H_2S$ and COS, at least one gas selected from the group consisting of $H_2O$, $N_2$, $CH_4$, and A, and entrained fly-ash in admixture with copper oxysulfide when the partial oxidation and desulfurization reactions take place at a temperature which is 10° to 200° F. below the softening temperature of the ash in the solid fuel and below about 2000° F., and a pressure in the range of about 2 to 250 atmospheres, or entrained molten slag when the partial oxidation and desulfurization reactions take place in the slagging mode at a temperature in the range of above about 2000° F. to 2900° F. and above the softening temperature of the ash in the solid fuel, and a pressure in the range of about 2 to 250 atmospheres; wherein the mole ratio in the reaction zone for $H_2O/H_2$ is in the range of about 0.4 to 3.0, and wherein substantially no elemental iron or copper is produced and there is substantially no formation of additional copper silicates in the gas generator from said copper-containing material and the silicates from said solid carbonaceous fuel, and at least 90 wt. % of the sulfur in the solid carbonaceous fuel in the reaction zone is converted into said copper oxysulfide particulate matter which leaves the reaction zone along with said fly-ash or molten slag; and (2) cooling and cleaning the hot raw product gas mixture from (1).

2. The process of claim 1 wherein said sulfur and silicate-containing solid carbonaceous fuel is selected from the group consisting of coal including subbituminous, bituminous, anthracite, and lignite; coke made from coal, petroleum coke; oil shale; tar sands, pitch, and mixtures thereof.

3. The process of claim 1 wherein said copper containing material is selected from the group consisting of copper oxide, copper hydroxide, copper carbonate, copper nitrate, copper chloride, and mixtures thereof.

4. The process of claim 1 wherein said copper-containing material comprises a cuprous or cupric organic compound selected from the group consisting of naphthenates, oxalates, acetates, benzoates, oleates, tartrates, and mixtures thereof.

5. The process of claim 1 wherein said feed mixture comprises a water slurry of solid carbonaceous fuel and copper-containing compound which is introduced downwardly into said reaction zone by way of the intermediate concentric annular passage of a burner comprising a central passage, said intermediate concentric annular passage, and an outer concentric annular passage; and a stream of free-oxygen containing gas is simultaneously passed through the central and outer annular passages of said burner.

6. The process of claim 5 wherein said aqueous slurry of solid carbonaceous fuel and copper-containing material comprises a pumpable liquid slurry having a solids content of about 30–70 wt. %; and provided with the step of skimming the aqueous carrier prior to said mixture entering the reaction zone to reduce the amount of $H_2O$ entering the gas generator to about 5 to 10 wt. % (basis weight of feed).

7. The process of claim 1 wherein said partial oxidation and desulfurization reactions take place in the fly-ash mode and provided with the steps of cooling and cleaning the hot raw product gas mixture in (2) by contacting said hot raw product gas mixture with a liquid hydrocarbonaceous fuel cooling and scrubbing agent thereby producing a slurry comprising fly-ash and copper oxysulfide in liquid hydrocarbonaceous fuel.

8. The process of claim 7 provided with the steps of steam stripping said slurry comprising fly-ash and copper oxysulfide in liquid hydrocarbonaceous fuel and separating $H_2S$ that is formed thereby, and recycling the sulfur-depleted slurry on the front end of the process for use in preparation of fresh feed mixture to the partial oxidation gas generator.

9. The process of claim 8 provided with the step of recovering sulfur from the mixture of steam and $H_2S$ in a conventional sulfur-recovery facility.

10. The process of claim 1 wherein the partial oxidation reaction in (1), takes place in a free-flow unobstructed down-flowing vertical refractory lined reaction zone.

11. The process of claim 1 provided with the step of mixing the hot raw effluent gas stream prior to cooling in step (2) with a $CO_2$-rich stream to provide the effluent gas stream with a $CO_2/H_2$ mole ratio in the range of about 10 to 0.5 and passing the $CO_2$-enriched effluent gas stream through a bed of copper containing material; wherein substantially all of the remaining gaseous sulfur compounds in the effluent gas stream are removed by reacting with copper in said bed and converted into copper oxysulfide.

12. The process of claim 11 wherein said bed of copper containing material contains an additional additive selected from the group consisting of magnesium, zinc, manganese, and mixtures thereof.

13. The process of claim 12 wherein the mole ratio of copper in said bed of copper-containing material to said additional additive is in the range of about 10 to 100.

14. The process of claim 1 wherein said feed mixture comprises solid carbonaceous fuel and copper-containing material in admixture with steam or $CO_2$.

* * * * *